US012283175B2

(12) United States Patent
Wolf et al.

(10) Patent No.: US 12,283,175 B2
(45) Date of Patent: Apr. 22, 2025

(54) MONITORING AN AEROSOL DENSITY LEVEL IN A FIRE SENSING DEVICE

(71) Applicant: Honeywell International Inc., Charlotte, NC (US)

(72) Inventors: Benjamin H. Wolf, Leicester (GB); Christopher Dearden, Melton Mowbray (GB); Michael Barson, Nuneaton (GB)

(73) Assignee: Honeywell International Inc., Charlotte, NC (US)

(*) Notice: Subject to any disclaimer, the term of this patent is extended or adjusted under 35 U.S.C. 154(b) by 83 days.

(21) Appl. No.: 18/221,675

(22) Filed: Jul. 13, 2023

(65) Prior Publication Data

US 2025/0022361 A1 Jan. 16, 2025

(51) Int. Cl.

| | |
|---|---|
| ***G08B 29/00*** | (2006.01) |
| ***G08B 17/107*** | (2006.01) |
| ***G08B 29/04*** | (2006.01) |
| ***G08B 29/14*** | (2006.01) |

(52) U.S. Cl.
CPC ......... *G08B 29/145* (2013.01); *G08B 17/107* (2013.01); *G08B 29/043* (2013.01)

(58) Field of Classification Search
CPC ... G08B 29/145; G08B 17/107; G08B 29/043
See application file for complete search history.

(56) References Cited

U.S. PATENT DOCUMENTS

| | | | | |
|---|---|---|---|---|
| 5,798,701 | A * | 8/1998 | Bernal | G08B 17/10 340/630 |
| 7,934,411 | B2 * | 5/2011 | Koch | G08B 29/145 73/1.06 |
| 9,659,485 | B2 * | 5/2017 | Piccolo, III | G08B 29/145 |
| 10,943,466 | B2 | 3/2021 | Rodriguez | |
| 11,132,891 | B2 | 9/2021 | Dearden et al. | |
| 2015/0253165 | A1 * | 9/2015 | Ajay | G08B 17/10 73/28.01 |
| 2023/0162593 | A1 | 5/2023 | Lang et al. | |

FOREIGN PATENT DOCUMENTS

| | | | |
|---|---|---|---|
| CN | 110782640 | A | 2/2020 |
| CN | 114495465 | A | 5/2022 |
| JP | 2022130944 | A | 9/2022 |
| WO | 2022128890 | A1 | 6/2022 |

* cited by examiner

*Primary Examiner* — Toan N Pham
(74) *Attorney, Agent, or Firm* — Brooks, Cameron & Huebsch, PLLC

(57) ABSTRACT

Devices, methods, and systems for monitoring an aerosol density level in a self-testing fire sensing device are described herein. One device includes an adjustable particle generator configured to generate aerosol, an optical scatter chamber configured to measure an aerosol density level of the aerosol, and a controller configured to compare the measured aerosol density level with a threshold aerosol density level and stop the adjustable particle generator from generating the aerosol responsive to the measured aerosol density level reaching and remaining at or above the threshold aerosol density level for a particular period of time.

20 Claims, 7 Drawing Sheets

MONITORING AN AEROSOL DENSITY LEVEL IN A FIRE SENSING DEVICE

TECHNICAL FIELD

The present disclosure relates generally to devices, methods, and systems for monitoring an aerosol density level in a fire sensing device.

BACKGROUND

Large facilities (e.g., buildings), such as commercial facilities, office buildings, hospitals, and the like, may have a fire alarm system that can be triggered during an emergency situation (e.g., a fire) to warn occupants to evacuate. For example, a fire alarm system may include a fire control panel and a plurality of fire sensing devices (e.g., smoke detectors), located throughout the facility (e.g., on different floors and/or in different rooms of the facility) that can sense a fire occurring in the facility and provide a notification of the fire to the occupants of the facility via alarms.

Maintaining the fire alarm system can include regular testing of fire sensing devices mandated by codes of practice in an attempt to ensure that the fire sensing devices are functioning properly. However, since tests may only be completed periodically, there is a risk that faulty fire sensing devices may not be discovered quickly or that tests will not be carried out on all the fire sensing devices in a fire alarm system.

A typical test includes a maintenance engineer using pressurized aerosol to force synthetic smoke into a chamber of a fire sensing device, which can saturate the chamber. In some examples, the maintenance engineer can also use a heat gun to raise the temperature of a heat sensor in a fire sensing device and/or a gas generator to expel carbon monoxide (CO) gas into a fire sensing device. These tests may not accurately mimic the characteristics of a fire and as such, the tests may not accurately determine the ability of a fire sensing device to detect an actual fire.

Also, this process of manually testing each fire sensing device can be time consuming, expensive, and disruptive to a business. For example, a maintenance engineer is often required to access fire sensing devices which are situated in areas occupied by building users or parts of buildings that are often difficult to access (e.g., elevator shafts, high ceilings, ceiling voids, etc.). As such, the maintenance engineer may take several days and several visits to complete testing of the fires sensing devices, particularly at a large site. Additionally, it is often the case that many fire sensing devices never get tested because of access issues.

Over time a fire sensing device can become dirty with dust and debris, for example, and become clogged. A clogged fire sensing device can prevent air and/or particles from passing through the fire sensing device to sensors in the fire sensing device, which can prevent a fire sensing device from detecting smoke, fire, and/or carbon monoxide.

DETAILED DESCRIPTION

Figure 1:
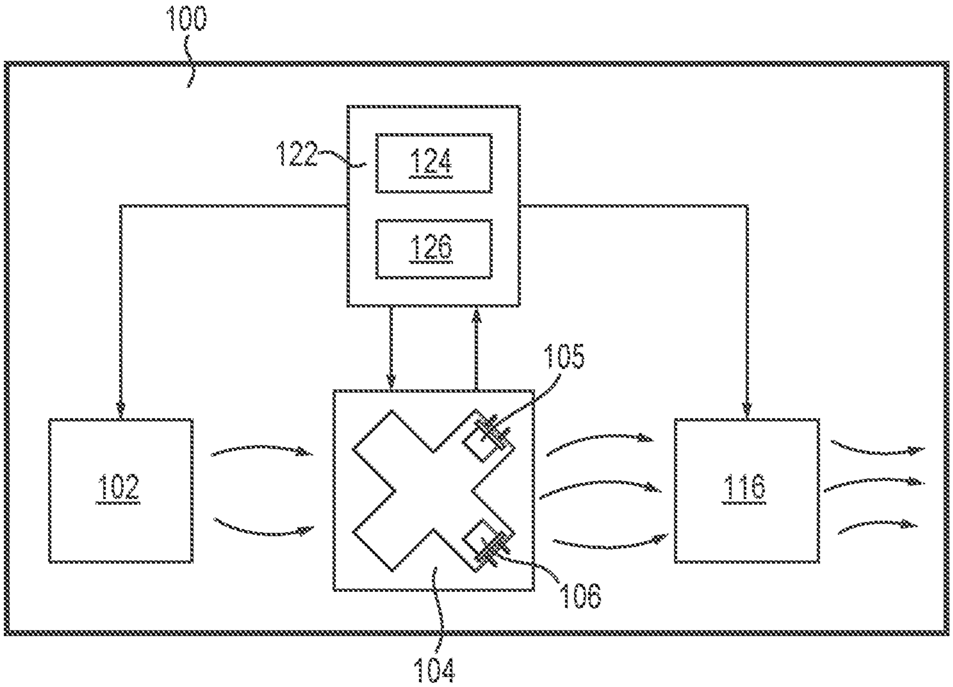
FIG. 1 illustrates a block diagram of a self-test function of a fire sensing device in accordance with an embodiment of the present disclosure.

Devices, methods, and systems for monitoring an aerosol density level in a self-testing fire sensing device are described herein. One device includes an adjustable particle generator configured to generate aerosol, an optical scatter chamber configured to measure an aerosol density level of the aerosol, and a controller configured to compare the measured aerosol density level with a threshold aerosol density level and stop the adjustable particle generator from generating the aerosol responsive to the measured aerosol density level reaching and remaining at or above the threshold aerosol density level for a particular period of time.

Previous fire sensing devices in which wax and/or liquid is heated to a particular temperature and/or for a particular amount of time to generate aerosol for testing the functionality of the device can create too little aerosol or too much aerosol due to environmental factors including temperature, airflow, sensor orientation, pressure, and/or relative humidity and/or manufacturing variability due to coil resistance, coil turns, wire style, and/or initial liquid or wax quantity, among other manufacturing variabilities. In contrast, fire sensing devices in accordance with the present disclosure can create a more controlled quantity of aerosol by stopping the generation of the aerosol when the measured aerosol density level reaches a threshold aerosol density level. Accordingly, fire sensing devices in accordance with the present disclosure may use less liquid and/or wax to generate the aerosol, have lower visible pollution rates per test, reduce wax contamination build-up rate, compensate for manufacturing variables, compensate for operational variables, compensate for environmental variables, and/or have better tolerance than previous devices.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 illustrates a block diagram of a self-test function of a fire sensing device 100 (e.g., fire sensing device 100 can be a self-testing fire sensing device) in accordance with an embodiment of the present disclosure. The fire sensing device 100 includes a controller (e.g., microcontroller) 122, an adjustable particle generator 102, an optical scatter chamber 104, and a variable airflow generator 116.

The controller 122 can include a memory 124 and a processor 126. Memory 124 can be any type of storage medium that can be accessed by processor 126 to perform various examples of the present disclosure. For example, memory 124 can be a non-transitory computer readable medium having computer readable instructions (e.g., computer program instructions) stored thereon that are executable by processor 126 to monitor an aerosol density level in fire sensing device 100 in accordance with the present disclosure. For instance, processor 126 can execute the executable instructions stored in memory 124 to compare a measured aerosol density level with a threshold aerosol density level and stop the adjustable particle generator 102 from generating aerosol responsive to the measured aerosol density level reaching and remaining at or above the threshold aerosol density level for a particular period of time. In some examples, memory 124 can store the measured aerosol density level, the threshold aerosol density level, and/or a baseline aerosol density level.

In a number of embodiments, the controller 122 can send a command to the adjustable particle generator 102 to generate particles (e.g., aerosol particles). The aerosol particles can be solid or liquid particles in a gas. The particles generated by the adjustable particle generator 102 can be moved (e.g., drawn) through the optical scatter chamber 104 by the variable airflow generator 116 generating airflow and creating a controlled aerosol density level. The threshold aerosol density level can be sufficient to trigger a fire response from the fire sensing device 100 without saturating the optical scatter chamber 104. The threshold aerosol density level can be from 0.2 to 1.0 decibels per meter (dB/m), for example. As shown in FIG. 1, the optical scatter chamber 104 can include a transmitter light-emitting diode (LED) 105 and a receiver photodiode 106 to measure the aerosol density level.

Responsive to the measured aerosol density level reaching and remaining at or above the threshold aerosol density level for a particular period of time, the variable airflow generator 116 can continue generating the airflow to decrease the aerosol density level within the fire sensing device 100. The optical scatter chamber 104 can measure an additional aerosol density level while the variable airflow generator 116 continues generating the airflow. The controller 122 can compare the additional measured aerosol density level to a baseline aerosol density level. The controller 122 can stop the variable airflow generator 116 from generating the airflow after a particular period of time or responsive to the additional measured aerosol density level reaching the baseline aerosol density level.

In some examples, the additional aerosol density level of the aerosol can be measured in the optical scatter chamber 104 responsive to stopping the adjustable particle generator 102 from generating the aerosol and the variable airflow generator 116 can be stopped from generating the airflow responsive to the additional measured aerosol density level decreasing to the baseline aerosol density level.

The variable airflow generator 116 can continue to generate airflow responsive to the additional measured aerosol density level being above the baseline aerosol density level. Additional aerosol density levels can be measured in the optical scatter chamber 104 and the variable airflow generator 116 can be stopped responsive to one or more of the measured additional aerosol density levels decreasing to the baseline aerosol density level.

In some examples, the adjustable particle generator 102 can continue generating aerosol for a particular amount of time while the measured aerosol density level remains at or above the threshold aerosol density level. For example, the adjustable particle generator 102 can stop generating aerosol one second after the measured aerosol density level reaches the threshold aerosol density level.

The adjustable particle generator 102 can continue to generate aerosol and the optical scatter chamber 104 can continue to measure the aerosol density level until a measured aerosol density level reaches (e.g., increases to) the threshold aerosol density level. For example, the adjustable particle generator 102 can generate aerosol responsive to a measured aerosol density level being below the threshold aerosol density level. Additional aerosol density levels of the aerosol in the optical scatter chamber 104 can be measured and the adjustable particle generator 102 can be stopped from generating the aerosol responsive to one or more of the measured additional aerosol density levels increasing to the threshold aerosol density level. If the aerosol density level within the fire sensing device 100 fails to reach the threshold aerosol density level and/or the baseline aerosol density level, a message can be transmitted.

Figure 2:
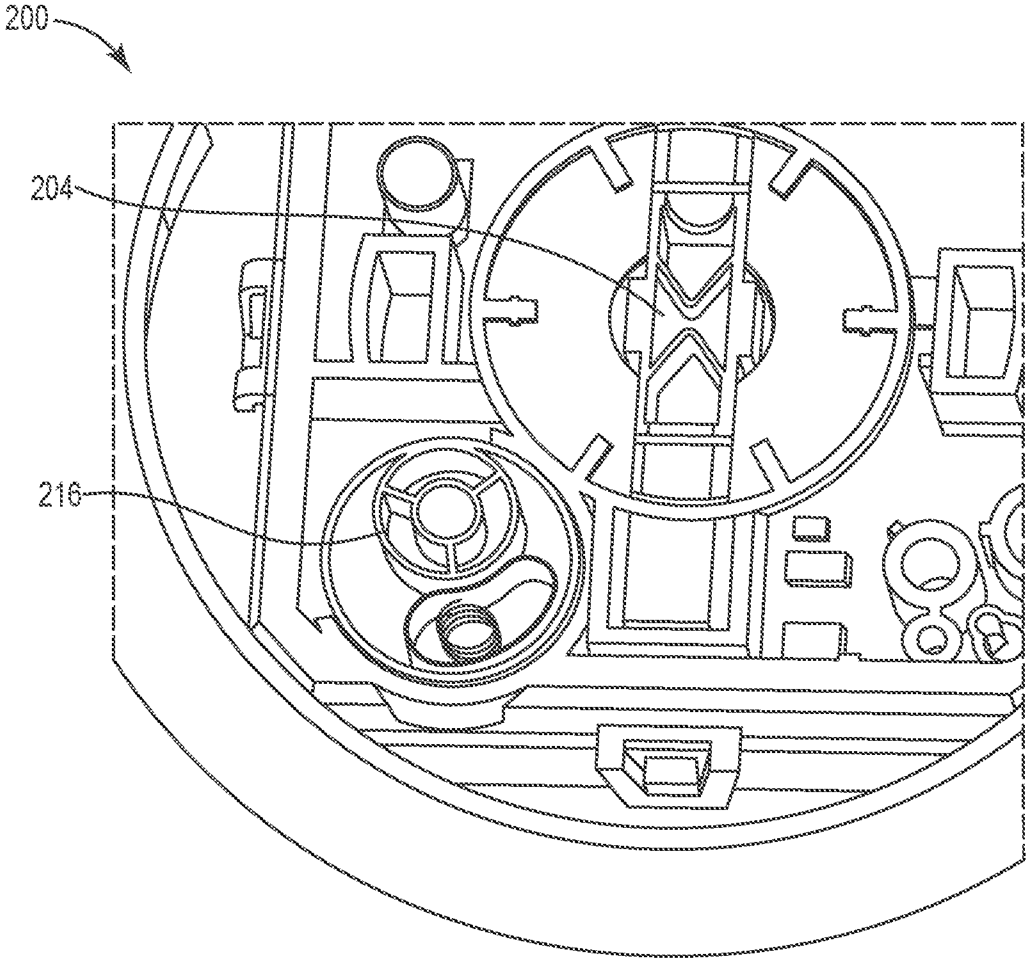
FIG. 2 illustrates a portion of an example of a self-testing fire sensing device in accordance with an embodiment of the present disclosure.

FIG. 2 illustrates a portion of an example of a self-testing fire sensing device 200 in accordance with an embodiment of the present disclosure. The fire sensing device 200 can be, but is not limited to, a fire and/or smoke detector of a fire control system.

A fire sensing device 200 can sense a fire occurring in a facility and trigger a fire response to provide a notification of the fire to occupants of the facility. A fire response can include visual and/or audio alarms, for example. A fire response can also notify emergency services (e.g., fire departments, police departments, etc.) In some examples, a plurality of fire sensing devices can be located throughout a facility (e.g., on different floors and/or in different rooms of the facility).

A fire sensing device 200 can automatically or upon command conduct one or more tests contained within the fire sensing device 200. The one or more tests can determine whether the fire sensing device 200 is functioning properly and/or requires maintenance.

As shown in FIG. 2, fire sensing device 200 can include an optical scatter chamber 204 and a variable airflow generator 216, which can correspond to the optical scatter chamber 104 and the variable airflow generator 116 of FIG. 1, respectively. Further fire sensing device 200 can also include a controller and an adjustable particle generator analogous to those of FIG. 1. Further, the functionality of optical scatter chamber 204 and variable airflow generator 216 can be analogous to that further described herein for chamber 304 and variable airflow generator 316 in connection with FIG. 3.

Figure 3:
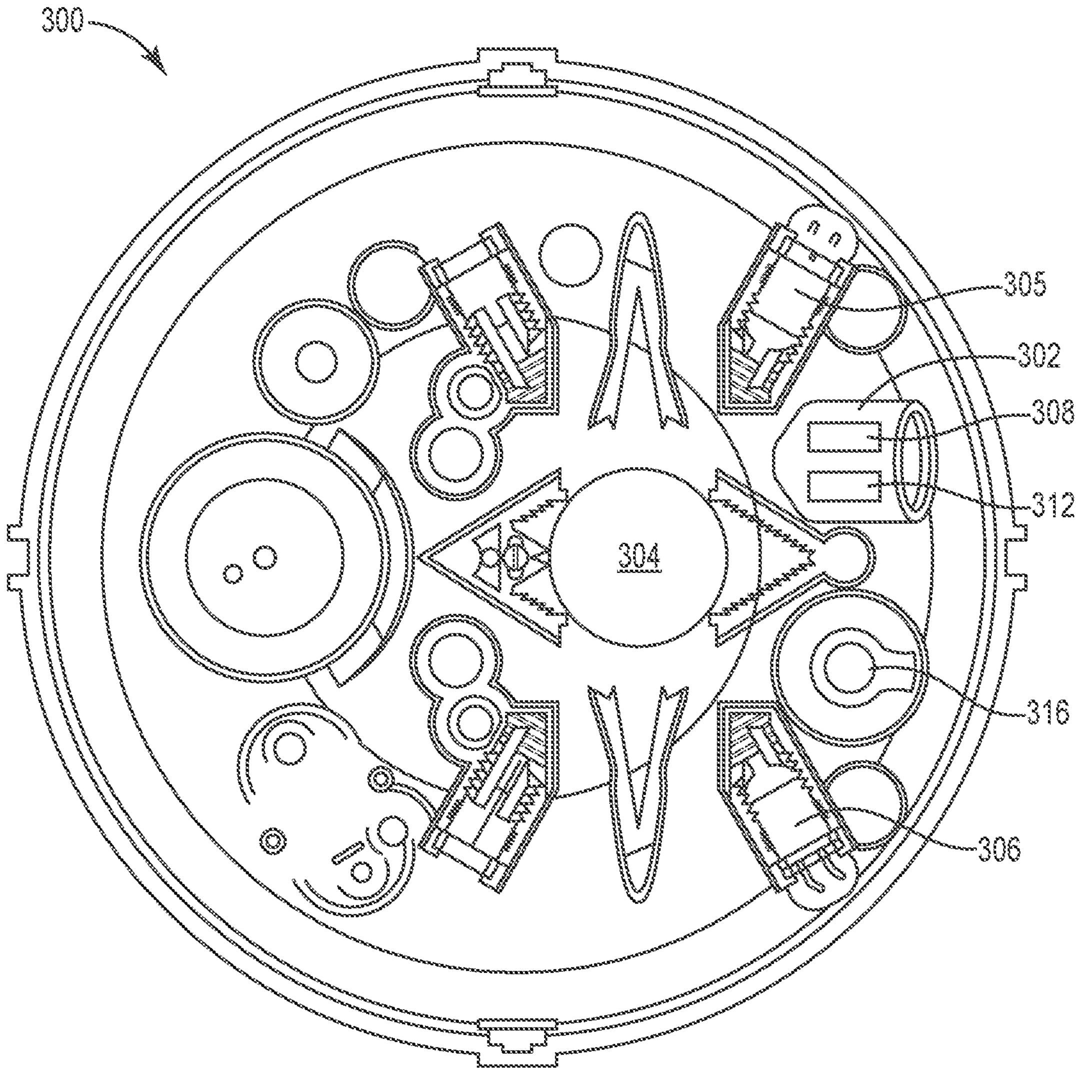
FIG. 3 illustrates an example of a self-testing fire sensing device in accordance with an embodiment of the present disclosure.

FIG. 3 illustrates an example of a self-testing fire sensing device 300 in accordance with an embodiment of the present disclosure. The fire sensing device 300 can be, but is not limited to, a fire and/or smoke detector of a fire control system. Fire sensing device 300 can correspond to fire sensing device 100 or 200 in FIG. 1 or FIG. 2, respectively.

Fire sensing device 300 can automatically or upon command conduct one or more tests contained within the fire sensing device 300. The one or more tests can determine whether the fire sensing device 300 is functioning properly and/or requires maintenance.

As shown in FIG. 3, fire sensing device 300 can include an adjustable particle generator 302, an optical scatter chamber 304 including a transmitter light-emitting diode (LED) 305 and a receiver photodiode 306, a heat source 308, a reservoir 312, and a variable airflow generator 316. In some examples, a fire sensing device 300 can also include a controller including memory and/or a processor, as previously described in connection with FIG. 1.

The heat source 308 of the adjustable particle generator 302 can heat liquid and/or wax contained within the reservoir 312 to generate aerosol particles which can be mixed into a controlled aerosol density level by the variable airflow generator 316. The heat source 308 can be a coil of resistance wire, for example. A current flowing through the coil of resistance wire can be used to control the temperature of the heat source 308 and further control the number of particles produced by the adjustable particle generator 302. The heat source 308 can heat the liquid and/or wax to create airborne particles to simulate smoke from a fire. The particles can measure approximately 1 micrometer in diameter and/or the particles can be within the sensitivity range of the optical scatter chamber 304. The heat source 308 can heat the liquid and/or wax until the aerosol density level reaches a threshold aerosol density level; the heat source 308 can stop heating the liquid and/or wax responsive to the aerosol density level reaching and remaining at or above the threshold aerosol density level for a particular period of time. The threshold aerosol density level can be an aerosol density level sufficient to trigger a fire response from a properly functioning fire sensing device without saturating the optical scatter chamber 304 and/or an aerosol density level sufficient to test a fault condition without triggering a fire response or saturating the optical scatter chamber 304.

The variable airflow generator 316 can control the airflow through the fire sensing device 300, including the optical scatter chamber 304. For example, the variable airflow generator 316 can move gases and/or aerosol from a first end of the fire sensing device 300 to a second end of the fire sensing device 300. In some examples, the variable airflow generator 316 can be a fan. The variable airflow generator 316 can start responsive to the adjustable particle generator 302 starting or the variable airflow generator 316 can start a particular period of time after the adjustable particle generator 302 has started. The variable airflow generator 316 can stop responsive to the adjustable particle generator 302 stopping, and/or the variable airflow generator 316 can stop a particular period of time after the adjustable particle generator 302 has stopped.

In a number of embodiments, once the measured aerosol density level has reached the threshold aerosol density level, the adjustable particle generator 316 can be turned off and the variable airflow generator 316 can increase the rate of airflow through the optical scatter chamber 304. The variable airflow generator 316 can increase the rate of airflow through the optical scatter chamber 304 to reduce the aerosol density level back to a baseline level. The baseline level can be an initial level of the optical scatter chamber 304 prior to the adjustable particle generator 302 generating particles. For example, the variable airflow generator 316 can remove the aerosol from the optical scatter chamber 304 after the measured aerosol density level reaches the threshold aerosol density level. If the fire sensing device 300 is not blocked or covered, then airflow from the external environment through the optical scatter chamber 304 will cause the aerosol density level to decrease. The optical scatter chamber 304 can sense the external environment due to a baffle opening in the fire sensing device 300 that allows air and/or smoke from a fire to flow through the fire sensing device 300.

As previously discussed, the fire sensing device 300 can generate a message if the device does not reach the threshold aerosol density level. The fire sensing device 300 can send the message to a monitoring device and/or a mobile device, for example. As an additional example, the fire sensing device 300 can include a user interface that can display the message.

Figure 4:
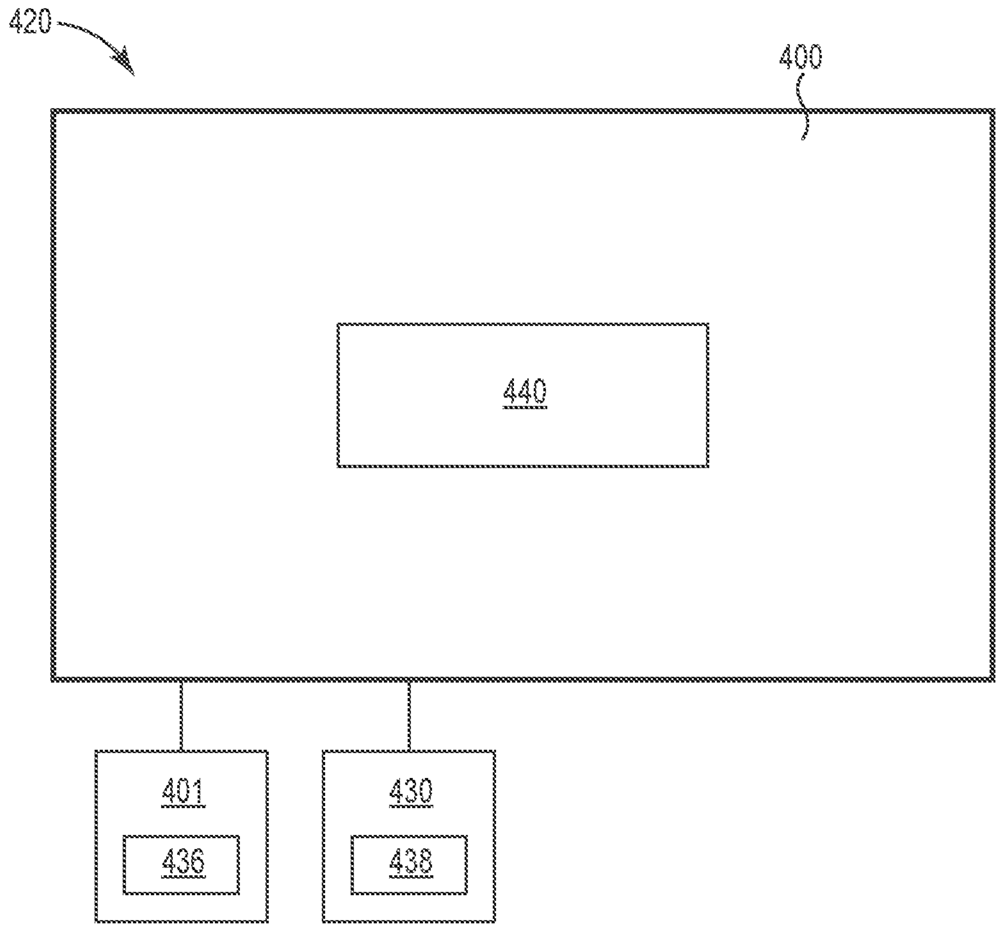
FIG. 4 illustrates a block diagram of a self-test function of a system in accordance with an embodiment of the present disclosure.

FIG. 4 illustrates a block diagram of a self-test function of a system 420 in accordance with an embodiment of the present disclosure. The system 420 can include a fire sensing device 400, a monitoring device 401, and a computing device 430. Fire sensing device 400 can be, for example, fire sensing device 100, 200, and/or 300 previously described in connection with FIGS. 1, 2, and 3, respectively.

The fire sensing device 400 can include a user interface 440. The user interface 440 can be a graphical user interface (GUI) that can provide and/or receive information to and/or from the user, the monitoring device 401, and/or the computing device 430. In some examples, the user interface 440 can display a message. The message can be displayed responsive to a measured aerosol density level failing to increase to a threshold aerosol density level and/or an additional measured aerosol density level failing to decrease to a baseline aerosol density level, for example.

The monitoring device 401 can be a control panel, a fire detection control system, and/or a cloud computing device of a fire alarm system. The monitoring device 401 can be configured to send commands to and/or receive messages from a fire sensing device 400 via a wired or wireless network. For example, the fire sensing device 400 can transmit (e.g., send) the monitoring device 401 a message responsive to the measured aerosol density level failing to increase to the threshold aerosol density level and/or the additional measured aerosol density level failing to decrease to the baseline aerosol density level.

The monitoring device 401 can receive messages from a number of fire sensing devices analogous to fire sensing device 400. For example, the monitoring device 401 can receive a message from each of a number of fire sensing devices analogous to fire sensing device 400 and create a maintenance schedule based on the messages from each of the number of fire sensing devices.

In a number of embodiments, the monitoring device 401 can include a user interface 436. The user interface 436 can be a GUI that can provide and/or receive information to and/or from a user and/or the fire sensing device 400. The user interface 436 can display messages and/or data received from the fire sensing device 400. For example, the user interface 436 can display a message that fire sensing device 400 requires maintenance.

In a number of embodiments, computing device 430 can receive the message from fire sensing device 400 and/or monitoring device 401 via a wired or wireless network. The computing device 430 can be a personal laptop computer, a desktop computer, a mobile device such as a smart phone, a tablet, a wrist-worn device, and/or redundant combinations thereof, among other types of computing devices.

In some examples, a computing device 430 can include a user interface 438 to display messages from the monitoring device 401 and/or the fire sensing device 400. For example, the user interface 438 can display the message. The user interface 438 can be a GUI that can provide and/or receive information to and/or from the user, the monitoring device 401, and/or the fire sensing device 400.

The networks described herein can be a network relationship through which fire sensing device 400, monitoring device 401, and/or computing device 430 can communicate with each other. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, the network can include a number of servers that receive information from, and transmit information to fire sensing device 400, monitoring device 401, and/or computing device 430 via a wired or wireless network.

As used herein, a "network" can provide a communication system that directly or indirectly links two or more computers and/or peripheral devices and allows a monitoring device 401 and/or a computing device 430 to access data and/or resources on a fire sensing device 400 and vice versa. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get data. Applications may also communicate with network management software, which can interact with network hardware to transmit information between devices on the network.

Figure 5:
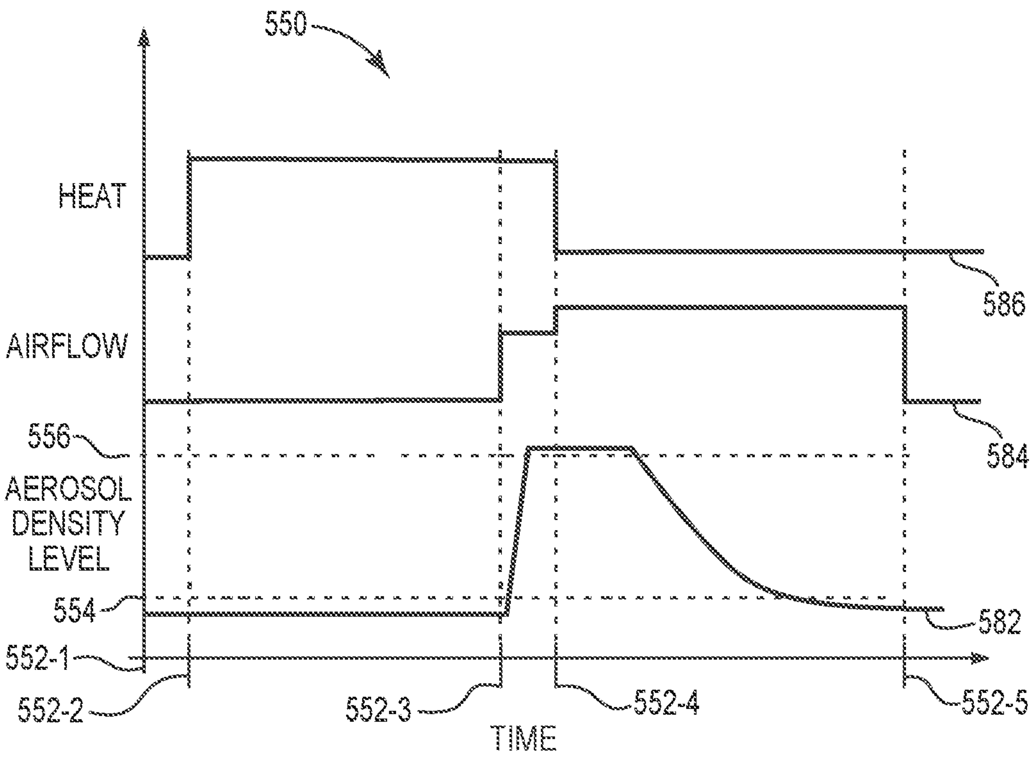
FIG. 5 illustrates a plot of example optical scatter chamber outputs used to determine when a measured aerosol density level reaches a threshold aerosol density level in a medium ambient airflow environment in accordance with an embodiment of the present disclosure.

FIG. 5 illustrates a plot (e.g., graph) 550 of example optical scatter chamber outputs (e.g., aerosol density level measurements) used to determine when a measured aerosol density level 582 reaches a threshold aerosol density level 556 in a medium ambient airflow environment in accordance with an embodiment of the present disclosure.

In the example illustrated in FIG. 5, a variable airflow generator (e.g., variable airflow generator 116, 216, or 316 previously described herein) and a heat source (e.g., heat source 308 in FIG. 3) of an adjustable particle generator (e.g., adjustable particle generator 102 or 302 previously described herein) can be powered off (e.g., turned off) at time 552-1, as indicated by airflow level 584 and heat level 586, respectively, illustrated in FIG. 5. At time 552-2, the heat source can be powered on (e.g., turned on) to heat wax and/or liquid to generate particles (e.g., aerosol particles), as previously described in connection with FIGS. 1 and 3.

At time 552-3 the variable airflow generator can be turned on. When turned on, the variable airflow generator (e.g., fan) can create airflow, as indicated by airflow level 584, to mix the generated particles into a controlled aerosol density level and move the generated particles through an optical scatter chamber (e.g., optical scatter chamber 104, 204, or 304 previously described herein). The optical scatter chamber can determine the measured aerosol density level 582 over time. As shown in FIG. 5, the measured aerosol density level 582 begins to increase after the variable airflow generator turns on and increases airflow within the fire sensing device.

The heat source can continue providing heat to generate particles until a threshold aerosol density level (e.g., setpoint) 556 is reached. The threshold aerosol density level 556 can be a sufficient aerosol density level to trigger a fire response (e.g., fire threshold) from a properly functioning fire sensing device without saturating the optical scatter chamber, for example.

It can take more or less time for a measured aerosol density level 582 to reach the threshold aerosol density level 556 based on environmental factors including airflow, as shown in FIG. 5, temperature, sensor orientation, pressure, and/or relative humidity and/or manufacturing variability due to coil resistance, coil turns, wire style, and/or initial liquid or wax quantity, among other manufacturing variabilities. For example, the measured aerosol density level 582 over time illustrated in FIG. 5 can be from a fire sensing device experiencing a medium ambient airflow, while the measured aerosol density level (e.g., measured aerosol density level 682) over time to be described in connection with FIG. 6 can be from a fire sensing device experiencing a high ambient airflow, and the measured aerosol density level (e.g., measured aerosol density level 782) over time to be described in connection with FIG. 7 can be from a fire sensing device experiencing a low ambient airflow.

In some examples, a fire sensing device experiencing a low ambient air temperature may take longer to reach the threshold aerosol density level 556 than a fire sensing device experiencing a medium ambient air temperature because it takes longer to heat the wax and/or liquid in a cooler environment. Similarly, the fire sensing device experiencing the medium ambient air temperature may take longer to reach the threshold aerosol density level 556 than a fire sensing device experiencing a high ambient air temperature.

The fire sensing devices in accordance with the present disclosure can create a more controlled quantity of aerosol by stopping the generation of aerosol when the measured aerosol density level 582 reaches the threshold aerosol density level 556 instead of stopping the generation of aerosol after a particular period of time and/or after a particular temperature is reached. Accordingly, fire sensing devices in accordance with the present disclosure may use less liquid and/or wax to generate aerosol, have lower visible pollution rates per self-test, reduce wax contamination build-up, compensate for manufacturing variables, compensate for operational variables, compensate for environmental variables, and/or have better tolerance devices with defined pass/fail criteria than previous fire sensing devices.

Once the threshold aerosol density level 556 is reached, or once the measured aerosol density level 582 has been above the threshold aerosol density level 556 for a period of time, the heat source can be turned off and the adjustable particle generator can stop generating particles at time 552-4. In some examples, the variable airflow generator can continue and/or increase the airflow 584, as illustrated in FIG. 5, to move the generated particles out of the optical scatter chamber.

After the heat source has been turned off, the measured aerosol density level 582 can decrease over time, as illustrated in FIG. 5. For example, the measured aerosol density level 582 can decrease to or below a baseline aerosol density level 554. In a number of embodiments, the variable airflow generator can be turned off at time 552-5 once the measured aerosol density level 582 reaches the baseline aerosol density level 554 or after the measured aerosol density level 582 has been below the baseline aerosol density level 554 for a period of time.

Figure 6:
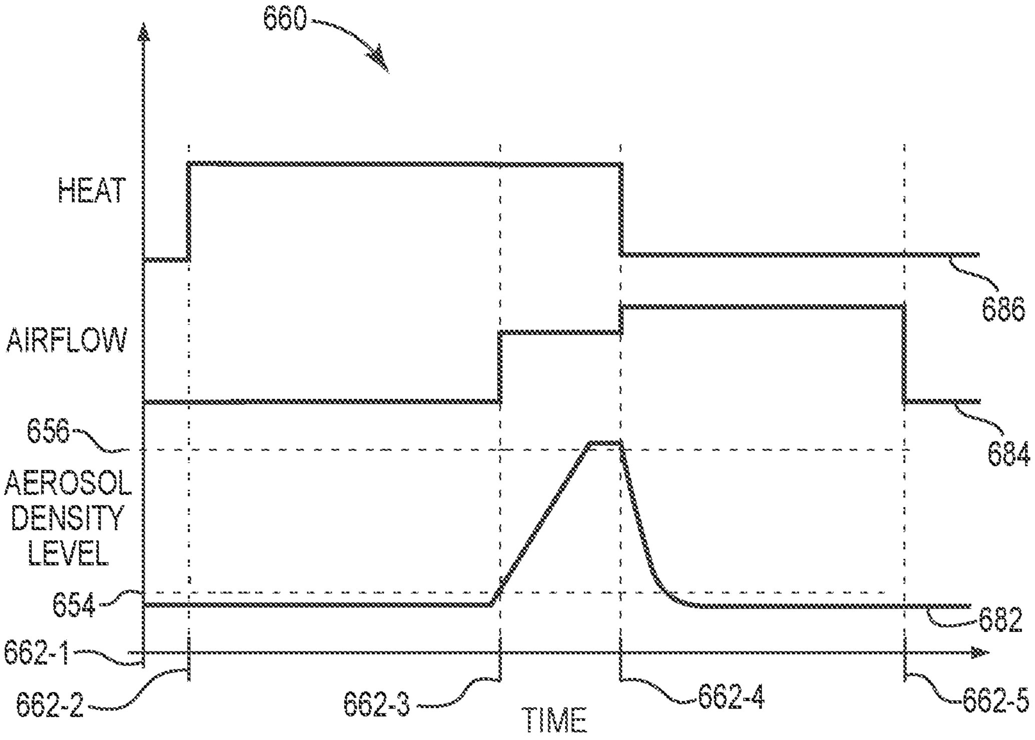
FIG. 6 illustrates a plot of example optical scatter chamber outputs used to determine when a measured aerosol density level reaches a threshold aerosol density level in a high ambient airflow environment in accordance with an embodiment of the present disclosure.

FIG. 6 illustrates a plot (e.g., graph) 660 of example optical scatter chamber outputs (e.g., aerosol density level measurements) used to determine when a measured aerosol density level 682 reaches a threshold aerosol density level 656 in a high ambient airflow environment in accordance with an embodiment of the present disclosure. A high ambient airflow environment can be due to, for example, the fire sensing device being near a fan, a vent, or a door.

In the example illustrated in FIG. 6, a variable airflow generator (e.g., variable airflow generator 116, 216, or 316 previously described herein) and a heat source (e.g., heat source 308 in FIG. 3) of an adjustable particle generator (e.g., adjustable particle generator 102 or 302 previously described herein) can be powered off (e.g., turned off) at time 662-1, as indicated by airflow level 684 and heat level 686, respectively, illustrated in FIG. 6. At time 662-2, the heat source can be powered on (e.g., turned on) to heat wax and/or liquid to generate particles (e.g., aerosol particles), as previously described in connection with FIGS. 1 and 3.

At time 662-3 the variable airflow generator can be turned on. When turned on, the variable airflow generator (e.g., fan) can create airflow, as indicated by airflow level 684, to mix the generated particles into a controlled aerosol density level and move the generated particles through an optical scatter chamber (e.g., optical scatter chamber 104, 204, or 304 previously described herein). The optical scatter chamber can determine the measured aerosol density level 682 over time. As shown in FIG. 6, the measured aerosol density level 682 begins to increase after the variable airflow generator turns on.

The heat source can continue providing heat to generate particles until a threshold aerosol density level (e.g., set-point) 656 is reached. Threshold aerosol density level 656 can correspond to threshold aerosol density level 556 in FIG. 5.

It can take more or less time for a measured aerosol density level 682 to reach the threshold aerosol density level 656 based on environmental factors including airflow, as shown in FIG. 6, and/or manufacturing variabilities. The fire sensing device, of the present figure, experiencing the high ambient airflow can take longer to reach the threshold aerosol density level 656 than the fire sensing device of FIG. 5 experiencing a medium ambient airflow.

Once the threshold aerosol density level 656 is reached or once the measured aerosol density level 682 has been above the threshold aerosol density level 656 for a period of time, the heat source can be turned off and the adjustable particle generator can stop generating particles at time 662-4. In some examples, the variable airflow generator can continue and/or increase the airflow 684, as illustrated in FIG. 6, to move the generated particles out of the optical scatter chamber.

After the heat source has been turned off, the measured aerosol density level 682 can decrease over time, as illustrated in FIG. 6. For example, the measured aerosol density level 682 can decrease to or below a baseline aerosol density level 654, which can correspond to the baseline aerosol density level 554 discussed in FIG. 5. In a number of embodiments, the variable airflow generator can be turned off at time 662-5 once the measured aerosol density level 682 reaches the baseline aerosol density level 654 or after the measured aerosol density level 682 has been at or below the baseline aerosol density level 654 for a period of time.

Figure 7:
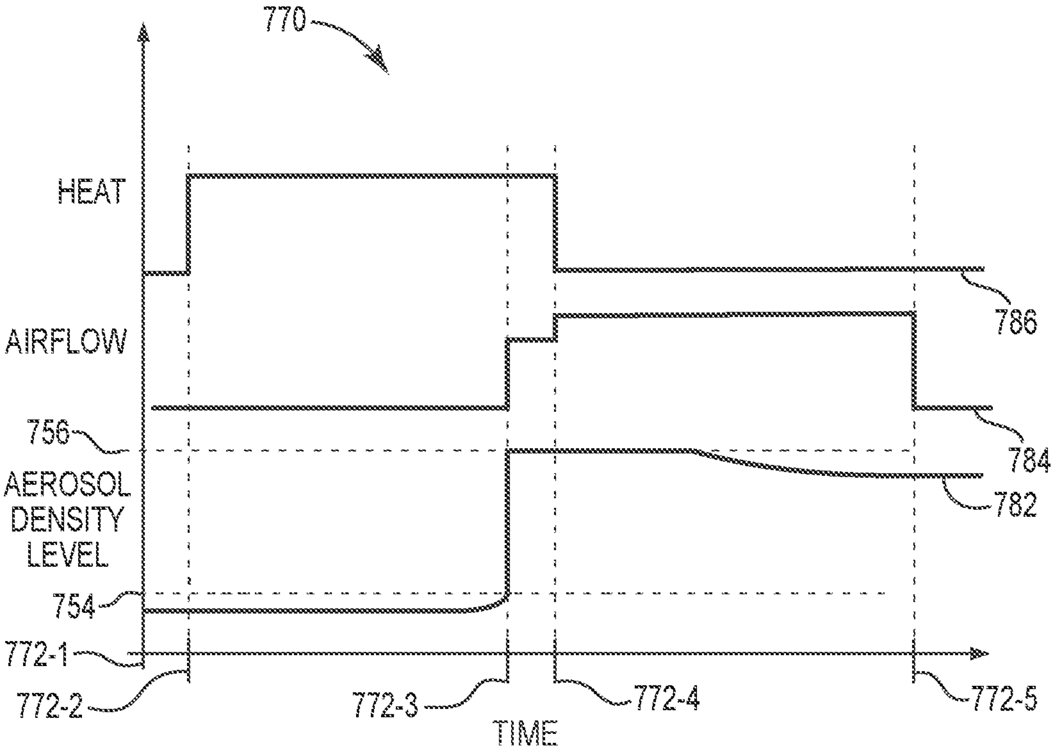
FIG. 7 illustrates a plot of example optical scatter chamber outputs used to determine when a measured aerosol density level reaches a threshold aerosol density level in a low ambient airflow environment in accordance with an embodiment of the present disclosure.

FIG. 7 illustrates a plot (e.g., graph) 770 of example optical scatter chamber outputs (e.g., aerosol density level measurements) used to determine when a measured aerosol density level 782 reaches a threshold aerosol density level 756 in a low ambient airflow environment in accordance with an embodiment of the present disclosure. A low ambient airflow environment can be due to, for example, the fire sensing device being masked. For example, the fire sensing device can be masked when the fire sensing device is covered or clogged, which can impede or prevent airflow and/or particles from entering and/or exiting the fire sensing device.

In the example illustrated in FIG. 7, a variable airflow generator (e.g., variable airflow generator 116, 216, or 316 previously described herein) and a heat source (e.g., heat source 308 in FIG. 3) of an adjustable particle generator (e.g., adjustable particle generator 102 or 302 previously described herein) can be powered off (e.g., turned off) at time 772-1, as indicated by airflow level 784 and heat level 786, respectively, illustrated in FIG. 7. At time 772-2, the heat source can be powered on (e.g., turned on) to heat wax and/or liquid to generate particles (e.g., aerosol particles), as previously described in connection with FIGS. 1 and 3.

At time 772-3 the variable airflow generator can be turned on. When turned on, the variable airflow generator (e.g., fan) can create airflow, as indicated by airflow level 784, to mix the generated particles into a controlled aerosol density level and move the generated particles through an optical scatter chamber (e.g., optical scatter chamber 104, 204, or 304 previously described herein). The optical scatter chamber can determine the measured aerosol density level 782 over time. As shown in FIG. 7, the measured aerosol density level 782 begins to increase after the variable airflow generator turns on.

The heat source can continue providing heat 786 to generate particles until a threshold aerosol density level (e.g., set-point) 756 is reached. Threshold aerosol density level 756 can correspond to threshold aerosol density level 556 in FIG. 5 and/or threshold aerosol density level 656 in FIG. 6.

It can take more or less time for a measured aerosol density level 782 to reach the threshold aerosol density level 756 based on environmental factors including airflow, as shown in FIG. 7, and/or manufacturing variabilities. The fire sensing device, of the present figure, experiencing the low ambient airflow can take less time to reach the threshold aerosol density level 756 than the fire sensing device of FIG. 5 experiencing a medium ambient airflow or the fire sensing device of FIG. 6 experiencing a high ambient airflow.

Once the threshold aerosol density level 756 is reached or once the measured aerosol density level 782 has been above the threshold aerosol density level 756 for a period of time, the heat source can be turned off and the adjustable particle generator can stop generating particles at time 772-4. In some examples, the variable airflow generator can continue and/or increase the airflow 784, as illustrated in FIG. 7, to move the generated particles out of the optical scatter chamber.

After the heat source has been turned off, the measured aerosol density level 782 can decrease over time. For example, the measured aerosol density level 782 can decrease to or below a baseline aerosol density level 754, which can correspond to the baseline aerosol density level 554 discussed in FIG. 5 or baseline aerosol density level 654 discussed in FIG. 6. In a number of embodiments, the variable airflow generator can be turned off once the measured aerosol density level 782 reaches the baseline aerosol density level 754 or after the measured aerosol density level 782 has been at or below the baseline aerosol density level 754 for a period of time.

In the example illustrated in FIG. 7, the measured aerosol density level 782 may not decrease to the baseline aerosol density level 754. The fire sensing device can be identified as masked and/or the optical scatter chamber can be identified as saturated at time 772-5 responsive to the measured aerosol density level 782 failing to decrease to the baseline aerosol density level 754 or failing to decrease to the baseline aerosol density level 754 after a particular period of time. The variable airflow generator can stop at time 772-5 and a monitoring device (e.g., monitoring device 401 in FIG. 4) and/or a computing device (e.g., computing device 430 in FIG. 4) can receive messages from the fire sensing device to notify a user that the fire sensing device is not functioning properly and/or needs maintenance due to being masked or the optical scatter chamber being saturated.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A self-testing fire sensing device, comprising:

an adjustable particle generator configured to generate aerosol;

an optical scatter chamber configured to measure an aerosol density level of the aerosol; and a controller configured to:

compare the measured aerosol density level with a threshold aerosol density level; and stop the adjustable particle generator from generating the aerosol responsive to the measured aerosol density level reaching and remaining at or above the threshold aerosol density level for a particular period of time.

2. The device of claim 1, further comprising a variable airflow generator configured to generate airflow to move the aerosol through the optical scatter chamber.

3. The device of claim 2, wherein the variable airflow generator is configured to continue generating the airflow responsive to the measured aerosol density level reaching the threshold aerosol density level.

4. The device of claim 3, wherein the controller is configured to stop the variable airflow generator from generating the airflow after a different particular period of time.

5. The device of claim 3, wherein the optical scatter chamber is configured to measure an additional aerosol density level while continuing to generate the airflow.

6. The device of claim 5, wherein the controller is configured to compare the additional measured aerosol density level to a baseline aerosol density level.

7. The device of claim 6, wherein the controller is configured to stop the variable airflow generator from generating the airflow responsive to the additional measured aerosol density level reaching the baseline aerosol density level.

8. The device of claim 6, further comprising a memory included in the controller, wherein the memory is configured to store the threshold aerosol density level and the baseline aerosol density level.

9. A method for operating a self-testing fire sensing device, comprising:

generating aerosol using an adjustable particle generator of the self-testing fire sensing device;

generating airflow to move the aerosol through an optical scatter chamber of the self-testing fire sensing device using a variable airflow generator of the self-testing fire sensing device;

measuring an aerosol density level of the aerosol in the optical scatter chamber;

stopping the adjustable particle generator from generating the aerosol responsive to the measured aerosol density level increasing to a threshold aerosol density level;

measuring an additional aerosol density level of the aerosol in the optical scatter chamber responsive to stopping the adjustable particle generator from generating the aerosol; and stopping the variable airflow generator from generating the airflow responsive to the additional measured aerosol density level decreasing to a baseline aerosol density level.

10. The method of claim 9, further comprising stopping the adjustable particle generator from generating the aerosol responsive to the measured aerosol density level increasing to the threshold aerosol density level and remaining at or above the threshold aerosol density level for a particular period of time.

11. The method of claim 9, further comprising continuing to generate aerosol using the adjustable particle generator responsive to the measured aerosol density level being below the threshold aerosol density level.

12. The method of claim 11, further comprising:

measuring additional aerosol density levels of the aerosol in the optical scatter chamber; and stopping the adjustable particle generator from generating the aerosol responsive to one or more of the measured additional aerosol density levels increasing to the threshold aerosol density level.

13. The method of claim 9, further comprising continuing to generate airflow using the variable airflow generator responsive to the additional measured aerosol density level being above the baseline aerosol density level.

14. The method of claim 13, further comprising:

measuring additional aerosol density levels of the aerosol in the optical scatter chamber; and stopping the variable airflow generator from generating the airflow responsive to one or more of the measured additional aerosol density levels decreasing to the baseline aerosol density level.

15. The method of claim 9, further comprising transmitting a message responsive to the measured aerosol density level failing to increase to the threshold aerosol density level or the additional measured aerosol density level failing to decrease to the baseline aerosol density level.

16. A self-testing fire sensing device, comprising:

a heat source configured to heat liquid or wax to generate aerosol;

an optical scatter chamber configured to measure an aerosol density level of the aerosol;

a variable airflow generator configured to generate airflow to move the aerosol through the optical scatter chamber; and a controller configured to:

compare the measured aerosol density level with a threshold aerosol density level; and stop the heat source from heating the liquid or wax responsive to the measured aerosol density level reaching and remaining at or above the threshold aerosol density level for a particular period of time.

17. The device of claim 16, wherein the threshold aerosol density level is from 0.2 to 1.0 decibels per meter (dB/m).

18. The device of claim 16, wherein the heat source is a coil of resistance wire.

19. The device of claim 16, wherein the variable airflow generator is a fan.

20. The device of claim 16, wherein the threshold aerosol density level is sufficient to trigger a fire response from the self-testing fire sensing device without saturating the optical scatter chamber.

* * * * *